(12) United States Patent  
Cho et al.

(10) Patent No.: US 8,405,835 B2
(45) Date of Patent: Mar. 26, 2013

(54) SCANNING MICROSCOPE USING HETERODYNE INTERFEROMETER

(75) Inventors: Kyuman Cho, Seoul (KR); Kang-Hyuk Kwon, Seoul (KR)

(73) Assignee: Industry-University Cooperation Foundation Sogang University (KR)

( * ) Notice: Subject to any disclaimer, the term of this patent is extended or adjusted under 35 U.S.C. 154(b) by 276 days.

(21) Appl. No.: 12/696,883

(22) Filed: Jan. 29, 2010

(65) Prior Publication Data

US 2010/0128279 A1    May 27, 2010

Related U.S. Application Data

(63) Continuation-in-part of application No. PCT/KR2008/000671, filed on Feb. 4, 2008.

(30) Foreign Application Priority Data

Aug. 1, 2007  (KR) .......................... 10-2007-0077275

(51) Int. Cl.
G01B 9/02    (2006.01)
(52) U.S. Cl. ..................................................... 356/485
(58) Field of Classification Search .................. 356/484, 356/485, 487
See application file for complete search history.

(56) References Cited

U.S. PATENT DOCUMENTS 4,886,363 A * 12/1989 Jungquist ..................... 356/487
5,371,588 A   12/1994 Davis et al.
2006/0232783 A1* 10/2006 Choma et al. ................. 356/479

FOREIGN PATENT DOCUMENTS

JP  06-324268   11/1994
JP  10-293019   11/1998

OTHER PUBLICATIONS

Baxter et al (Dual-Polarization Frequency-Modulated Laser Source, IEEE Photonics Technology Letters, vol. 8 No. 8, Aug. 1996).*
J. Moon, A Novel, Hybrid Sensor for a Precision, Wide Dynamic Range Measurement of Displacement Using a Heterodyne I/Q Interferometer Scheme, COOC 2003, vol. 10, No. 1, May 14-16, 2003, pp. 685-686.
Heeseong Jeong et al., "Complete mapping of complex reflection coefficient of a surface using a scanning homodyne multiport interferometer," Optics Communications, vol. 204, Apr. 1, 2002, pp. 45-52.

* cited by examiner

*Primary Examiner* — Tarifur Chowdhury
*Assistant Examiner* — Jonathon Cook
(74) *Attorney, Agent, or Firm* — Cantor Colburn LLP

(57) ABSTRACT

The present invention relates to a scanning microscope using a heterodyne interferometer, which can be used for mapping or imaging complex optical parameters such as physical structures and material properties of a sample under test. The heterodyne interferometer is designed to provide in- and quadrature-phase interference signal which can be used for extracting the phase and amplitude change induced on the probe beam. The phase and the amplitude of the probe beam, which is reflected from or transmitted through the sample, are modified by the physical structures and material properties of the sample. Therefore, by scanning the probe beam, local variations of the phase and amplitude can be mapped, and, thereby, three-dimensional microscopic physical structures and material properties can be imaged by processing the phase and amplitude values.

5 Claims, 9 Drawing Sheets

160 172 165

SCANNING MICROSCOPE USING HETERODYNE INTERFEROMETER

FIELD OF THE INVENTION

The present invention relates to a scanning microscope using a heterodyne interferometer, which can be used for mapping or imaging complex optical parameters such as physical structures and material properties of a sample under test.

DESCRIPTION OF THE RELATED ART

An interferometric measuring system is a system that combines a probe beam and a reference beam by using a beam splitter (BS) and measures the intensities of two output beams from the corresponding output ports of the BS by using two separate photodetectors. From now on, the output electric signal from each photodetector will be referred to as an electrical signal. When the probe beam and the reference beam have the same frequency, the system is referred to as a homodyne interferometer and the system is referred as a heterodyne interferometer when the frequencies of the probe beam and the reference beam are different.

In the case of a homodyne interferometer, the intensities of the output beams from the BS vary corresponding to the phase difference between the probe beam and the reference beam. Since the intensity must be conserved, if a constructive interference occurs in one of the two output beams, then a destructive interference must occur in the other beam. Output signals from the BS are 180 degrees out of phase and therefore, when the two electrical signals are subtracted by a differential amplifier, correlated noises on the respective electrical signals are rejected and the interference signals are doubled, thereby increasing the signal to noise ratio. This measuring technique is called as a balanced detection method. The output signal from the differential amplifier is expressed by the mathematical formula 1

$$\upsilon_{diff} = R\sqrt{I_S}\sqrt{I_{LO}} \cos(\Phi_0 + \Phi_m), \qquad \text{[Mathematical Equation 1]}$$

where $I_S$ and $I_{LO}$ represent, respectively, the intensities of the probe beam and reference beam, and $\Phi_m$ represent a phase value induced in the probe beam due to geometrical structure and/or refractive index of a sample and $\Phi_0$ represent the phase difference due to the different optical paths of the probe beam and the reference beam in the interferometer.

A scanning microscope using a conventional interferometer optimally measures a variation of the induced phase resulted from the structural change of a sample during the scanning process and therefrom obtain an image of the topographical structure of the surface or inside structure of the sample. Therefore, it is necessary to optimally measure $\Phi_m$ while scanning the sample or the probe beam. Since the magnitude of $\Phi_m$ is very small in most cases, the mathematical equation 1 can be rewritten as the mathematical equation 2, if the path length difference between the probe beam and the reference beam is kept at constant value by using a feedback control so that $\Phi_0$ is always $\pi(2n+1)/2$, wherein n=0, 1, 2, . . . .

$$\upsilon_{diff} = R\sqrt{I_S}\sqrt{I_{LO}} \sin\Phi_m = R\sqrt{I_S}\sqrt{I_{LO}}\Phi_m \qquad \text{[Mathematical Equation 2]}$$

Therefore, a magnitude of an interference signal is proportional to $\Phi_m$ and it is thus possible to map the local phase variations of the sample through scanning. However, when the intensity and phase of the probe beam vary at the same time, i.e. in the case that geometrical structure and material of the surface are changed at the same time, it is clear from mathematical equation 2 that these changes cannot be identified. This indistinguishability is a major drawback of the scanning microscope using a conventional interferometer and puts limitations on applications of the microscopy.

In the case of the heterodyne interferometer, the output electrical signal from the balanced detector can be represented by mathematical equation 3, $$\upsilon_{diff} = R\sqrt{I_S}\sqrt{I_{LO}} \cos(\Delta\omega t + \Phi_0 + \Phi_m), \qquad \text{[Mathematical Equation 3]}$$

where $\Delta\omega$ represents the frequency difference between the probe beam and the reference beam. In other words, the interference signal is a heterodyne beat signal between the probe and the reference beam. Since the signal frequency is in RF or microwave band, typical RF signal processing technique can be used to measure phase change or amplitude change induced on the probe beam.

Various interferometer schemes which can simultaneously measure the phase change and the amplitude change induced on the probe beam have been developed by the present inventors' team. They showed that a homodyne I/Q interferometer consists of two identical interferometers in which two reference beams propagating along the identical path but have 90° phase difference, which can be constructed by manipulating the state of polarization, and thereby making the resulting interference signals from these two interferometers 90 degrees out of phase. Therefore, if the output signal from one interferometer is represented by the mathematical equation 4, $$\upsilon_I = \frac{R}{2}\sqrt{I_0}\sqrt{I_{LO}}\cos(\Phi_0 + \Phi_m) \qquad \text{[Mathematical Equation 4]}$$

then the output signal from the other interferometer is represented by the mathematical equation 5.

$$\upsilon_Q = \frac{R}{2}\sqrt{I_0}\sqrt{I_{LO}}\sin(\Phi_0 + \Phi_m) \qquad \text{[Mathematical Equation 5]}$$

The signals given by mathematical equations 4 and 5 are referred to as the in-phase signal and quadrature-phase signal or, simply, I-signal and Q-signal, respectively. The phase difference between the probe beam and the reference is given by mathematical equation 6, $$\Phi_0 + \Phi_m = \tan^{-1}\frac{\upsilon_Q}{\upsilon_I} \qquad \text{[Mathematical Equation 6]}$$

and the amplitude of the probe beam can be given by mathematical equation 7.

$$\sqrt{I_0}\sqrt{I_{LO}} = \sqrt{\upsilon_I^2 + \upsilon_Q^2} \qquad \text{[Mathematical Equation 7]}$$

Therefore, the phase and the amplitude changes induced on the probe beam can be measured simultaneously by using the I/Q-interferometer. It should be emphasized from the mathematical equation 6, that the value given in mathematical equation 6 is an absolute phase value. Therefore, it does not require any calibration process to convert measured electrical signal to the corresponding phase value, which is another significant advantage of using an I/Q-interferometer for scanning microscopy, because conventional interferometers require a rigorous calibration processes. Details of the homodyne I/Q-interferometer and the scanning surface microscope are disclosed in reference document 1 (Heseong Jeong, Jong- Hoi Kim, and Kyuman Cho, "Complete mapping of complex reflection coefficient of a surface using a scanning homodyne multiport interferometer.", Optics communication, Vol. 204, pp. 45-52 (2002)). In this paper, the authors have shown that the homodyne I/Q-interferometer can be used for analyzing the structural and material properties of a sample under test. The phase and amplitude of the probe beam reflected from the surface were measured by using the homodyne I/Q-interferometer and the complete maps of the local phase values and amplitude values are obtained by scanning the sample, where, by processing the data, material and structural defects can be identified.

The homodyne I/Q-interferometer requires a more complicated optical arrangement than that of the conventional homodyne interferometer; it consists of three polarizing beam splitters and four photodetectors. Therefore, the correct operation of the interferometer requires a very difficult and precise alignment process. A new heterodyne interferometer scheme, which can simultaneously measure the phase and amplitude change in the probe beam, has been proposed by the present inventors' team. The phase and amplitude changes carried by the heterodyne beat signal were demodulated by using an I/Q-demodulation technique, which is a standard demodulation technique in RF communications. Since the I/Q-demodulation is performed in the RF domain, the same optical arrangement as that of a conventional heterodyne interferometer can be used, which is much simpler than that of the homodyne I/Q-interferometer. The heterodyne I/Q-interferometer scheme has been used for a high sensitivity displacement sensor application, and the result is disclosed in reference document 2 (Joon Moon, Heseong Jeong, and Kyuman Cho, "A novel, hybrid sensor for a precision, wide dynamic range measurement of displacement sensor using a heterodyne I/Q interferometer scheme", Proceedings of the 10$^{th}$ Conference on Optoelectronics and Optical Communications, Vol 10, 685 (2003)).

Since the heterodyne I/Q-interferometer has a much simpler optical arrangement, although the phase sensitivity is 3 dB lower than that of the homodyne I/Q-interferometer, it is more advantageous to use the heterodyne interferometer scheme in scanning microscope applications.

Throughout this application, several patents and publications are referenced and citations are provided in parentheses. The disclosure of these patents and publications is incorporated into this application in order to more fully describe this invention and the state of the art to which this invention pertains.

DETAILED DESCRIPTION OF THIS INVENTION

One of the objectives of the present invention is to provide a scanning microscope using a heterodyne interferometer which can simultaneously measure phase and amplitude changes induced on the probe beam while the beam is scanning over the region of interest.

Other features and advantages of the present invention will become more apparent when the preferred embodiment thereof with reference to the accompanying drawings are described.

To achieve the above and other objects, the present invention provides a scanning microscope using a heterodyne interferometer, which includes: a heterodyne interferometer that provides a probe beam to a sample, focuses the probe beam onto the surface or inside of the sample under test, recollimates the probe beam reflected from or transmitted through the sample, sends the probe beam back to the interferometer, mixes the probe beam with the reference beam and, thereby, down converts the phase and amplitude modulation into a intermediate frequency heterodyne beat signal, and converts the beat signal into the I- and Q-signal; a scanner, which has a sample holder, that moves in two directions perpendicular to the propagation direction of the probe beam; a scanner driver that actuates the XY scanner; a focusing device that focuses the probe beam onto a surface or inside of the sample; a collimating device that collimates the probe beam reflected from or transmitted through the sample; an analog to digital (A/D) converter that digitizes the output I- and Q-signal from the heterodyne interferometer; and a computer that receives and stores the digitized I- and Q-signal from the ND converter, calculates the phase and amplitude from the I- and Q-data, processes data to extract information about the optical and/or physical properties of the sample, sends commends for actuating the scanner to the scanner driver, and stores scanning information and absolute scanning position if available.

The scanning microscope is operated in either the back reflection geometry or the transmission geometry. In the back reflection geometry, the probe beam is focused onto a sample by using a focusing device, which may be a single focusing lens or set of lenses such as a microscope objective lens, and the reflected probe beam from the sample is recollimated by the same focusing device. In the transmission arrangement, the probe beam is focused to the sample by using a focusing device and the transmitted probe beam from the sample is collimated by using a collimating device. The collimated probe beam is then sent back to the interferometer by use of at least one folding mirror.

An I/Q-demodulator included in the heterodyne interferometer, converts the heterodyne beat signal between the probe and the reference beam into the I- and Q-signal. An I/Q-demodulator can also be constructed by use of two RF mixers, two 3 dB power splitters, and a 90° phase shifter.

A dual-frequency, dual-polarization, stabilized laser is used for the light source of the heterodyne interferometer, or a beam splitter and an acousto-optic modulator can be used to generate the probe and the reference beam of the interferometer, and two frequency-locked independent lasers can also be the light sources of the heterodyne interferometer. A balanced detection scheme can be used to improve the signal to noise ration, a signal photodiode followed by a band pass filter or a high pass filter can also be used to convert optical signal to electrical signal.

Since the heterodyne interferometer in this new scanning microscope can simultaneously measure both phase and amplitude change induced in the probe beam, it can provide more information for the sample than the conventional scheme, which cannot distinguish phase and amplitude changes. For example, in the reflection geometry, a complete topographical structure of the scanned surface can be reconstructed and imaged by processing phase measurement data, while change in material properties can be mapped by processing amplitude measurement data. As another example, in transmission geometry, real and imaginary part of the complex refractive index can be mapped by processing phase and amplitude measurement data.

Therefore, since it can provide more information than a conventional microscope, it has many useful applications. It can be used for complex diagnostics, evaluation, and inspection for semiconductor, bio, optoelectronics, and medical devices and materials. It can also be used as a basic instrument in R&D labs. The present invention has improved the shortcomings of the various existing scanning microscopes and is expected to contribute advance of high technology industry such as semiconductor or bio technology.

The scanning microscope according to the present invention described above can be used for mapping or imaging complex optical parameters such as physical structures and material properties of a sample under test. The heterodyne interferometer used in the scanning microscope is designed to provide in- and quadrature-phase interference signal which can be used for extracting the phase and amplitude change induced on the probe beam. The phase and the amplitude of the probe beam, which is reflected from or transmitted through the sample, are modified by the physical structures and material properties of the sample. Therefore, by scanning the probe beam, local variations of the phase and amplitude can be mapped, and, thereby, three-dimensional microscopic physical structures and material properties can be imaged by processing the phase and amplitude values. The scanning microscope according to the present invention has very simple optical arrangement and can be integrated into a low cost, small size, reliable, and versatile test equipment. It can also be integrated into an inspection or instrument in the fabrication/production line for semiconductor devices, photonic devices, bio-devices and components, and so forth.

The present invention will now be described in further detail through examples. It would be obvious to those skilled in the art that these examples are intended to be more concretely illustrative and the scope of the present invention as set forth in the appended claims is not limited to or by the examples.

DETAILED DESCRIPTION OF EXEMPLARY EMBODIMENTS

Reference will now be made in detail to a preferred embodiment of the present invention, examples of which are illustrated in the accompanying drawings.

Figure 1:
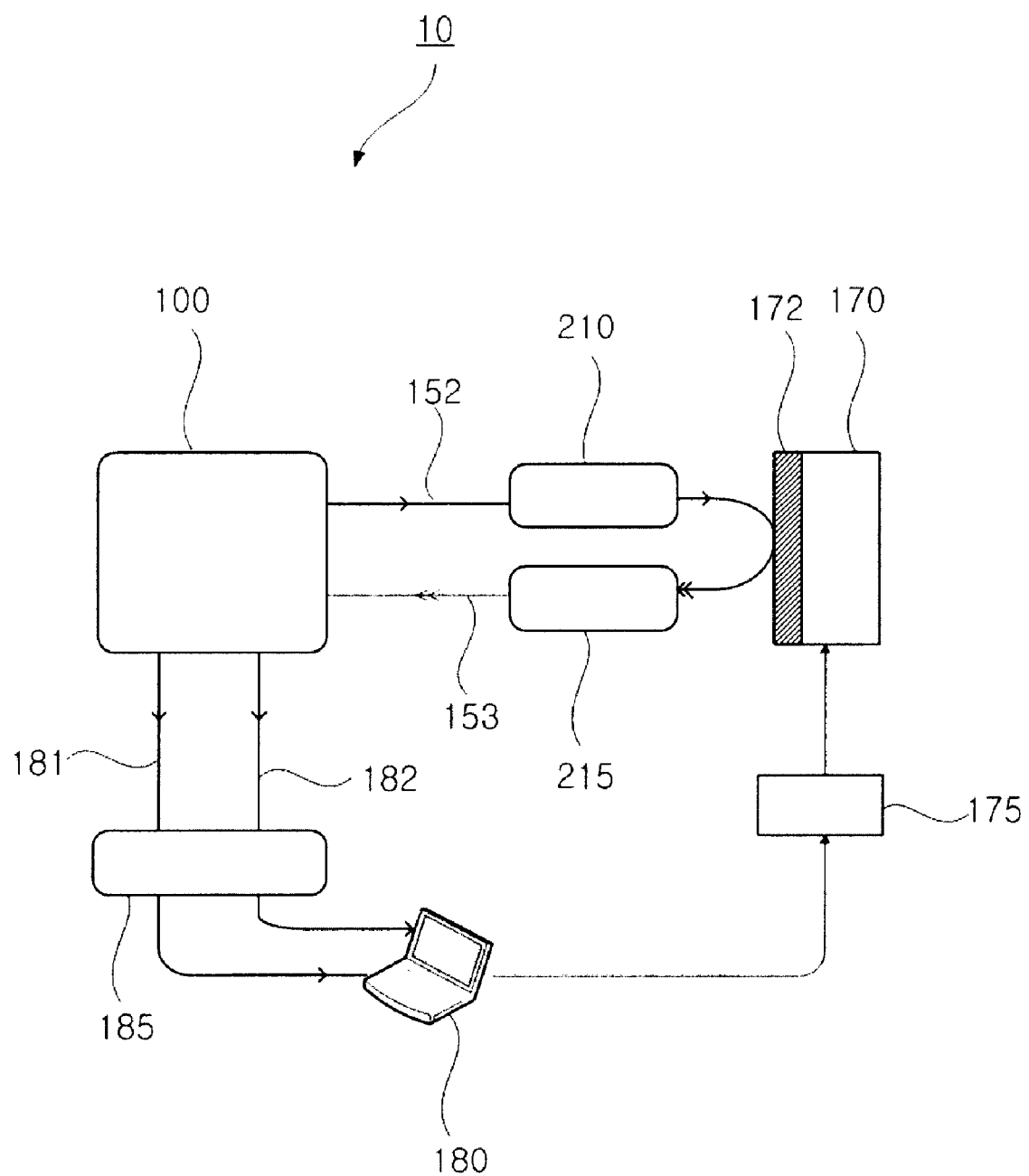
FIG. 1 illustrates an exemplary instrumentation the scanning microscope using a heterodyne interferometer according to a preferred embodiment of the present invention.

FIG. 1 illustrates an exemplary instrumentation of a scanning microscope according to a preferred embodiment of the present invention. Referring to FIG. 1, the scanning microscope 10 consists of a heterodyne interferometer 100, a focusing device 210, a collimating device 215, a scanner 170, sample 172 mounted on the at least 2-axis scanning stage of the scanner 170, a scanner driver 175 for the scanner 170, A/D converter 185, a computer 180 for controlling the scanner driver 175 and collecting, storing, and processing digitally converted analog signal from I and Q output ports of the interferometer 100. The phase and amplitude change induced on the probe beam can be measured simultaneously by processing I- and Q-signals by using the aforementioned procedure, and, therefrom, local variations of the complex properties of a sample can be imaged by applying it as the scanning microscope 10, according to the present invention having the aforementioned configuration. As one example, a 3-dimensional image of the topographical structure and a map of the material inhomogeneity can be obtained simultaneously by scanning the probe beam over the surface of the sample under test. As another example, local variations of the real and the imaginary part of the complex refractive index, which is very important spectroscopic characteristics specifying a material medium, can be mapped simultaneously by scanning the probe beam. More specifically, the scanning microscope 10 can be used for imaging and diagnosing bio devices and materials, semiconductor devices and materials, optoelectronics/photonics devices and materials, and so forth. Therefore, the scanning microscope 10 can be used as not only a basic microscopic imaging and evaluation equipment in a laboratory but also an inspection and/or diagnosing equipment in a fabrication/production line for high-tech devices. It is an another advantageous embodiment of the present invention that the absolute phase can be measured by using the aforementioned algorithm for processing I and Q signals, from which true topographical structure of the surface can be imaged. Hereinafter, components of the scanning microscope according to the present invention will be described in detail.

Figure 2:
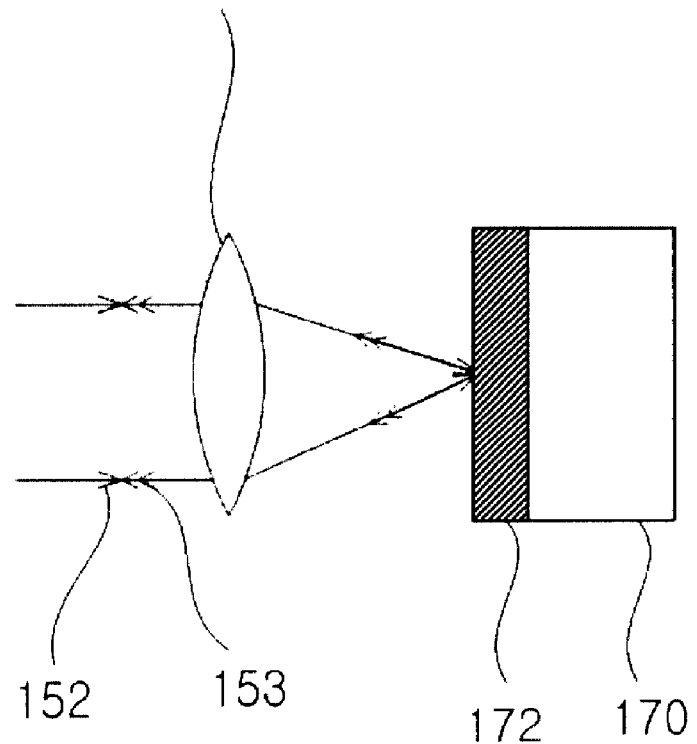
FIG. 2 illustrates an archetypal optical arrangement used for reflection geometry.
Figure 3:
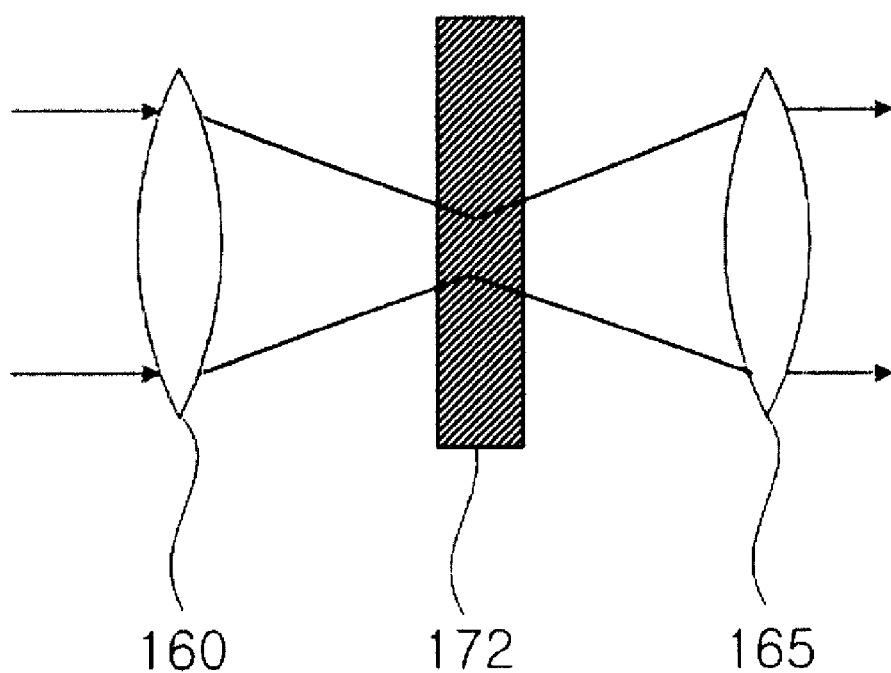
FIG. 3 illustrates an archetypal optical arrangement used for transmission geometry.

The probe beam 152 of the heterodyne interferometer 100, also referred to as an I/Q-interferometer, is focused onto a sample mounted on the scanner. The microscope can be operated as a reflection geometry and a transmission geometry, for which exemplary embodiments of optical arrangements are shown in FIG. 2 and FIG. 3, respectively. In the reflection geometry, as shown in FIG. 2, the probe beam 152 is focused onto the surface of the sample 172 by using the focusing device 210, which may be a focusing lens or an assembly of lenses which can provide desired spot size at the focus, and reflected beam from the sample 172 is recollimated by using the collimating device 215. In this case, one focusing device 210/215 is used to both focus and collimate the probe beam. In the transmission geometry, as shown in FIG. 3, the probe beam is focused to the sample by using the focusing device 160 and the transmitted beam through the sample is collimated by using the collimating device 165. The probe beam is scanned over the region of interests by using scanner 170. The scanner 170 may be a motorized precision motion stage or a PZT driven stage which can provide at least two axes scanning. A galvano mirror system can also be used for scanning the probe beam.

Figure 4:
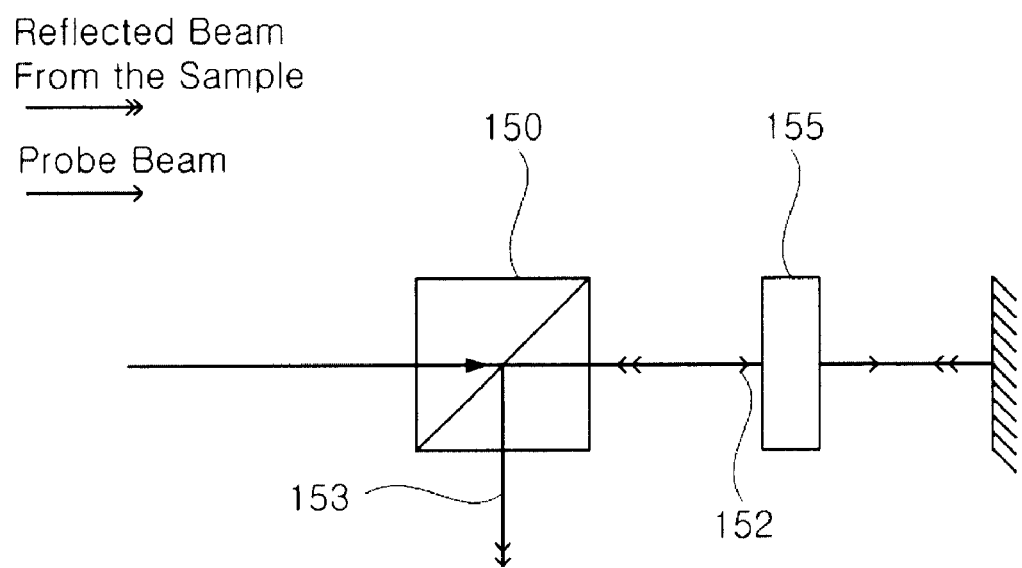
FIG. 4 illustrates an exemplary optical arrangement for delivering the probe beam to the sample and coupling the reflected probe beam from the sample back to the interferometer.

FIG. 4 illustrates a method for delivering the probe beam 152 to the sample and coupling the reflected beam 153 back to the interferometer. Because of the double pass in the quarter-wave plate or Faraday rotator 155, the plane of polarization of the probe beam 152 is rotated by 90° when the reflected beam 153 is returning back to the polarizing beam splitter 150, and, thereby, is reflected at the polarizing beam splitter 150 as shown in FIG. 4. The phase of the returning beam is determined by the total optical path length of the roundtrip; this is the reason why the phase change is induced by the topographical structure of the surface of the sample during the scanning. The amplitude of the reflected beam is determined by the reflection coefficient, which is an inherent optical property of the material. Therefore, the material inhomogeneity can be mapped from the scanning amplitude measurements. In the case of transmission geometry, a set of folding mirrors can be used for redirecting the transmitted beam into the interferometer. The amplitude and the phase of the probe beam are determined by the absorption coefficient and the effective optical thickness of the sample, respectively. The scanning transmission measurements can provide a map of local variations of the absorption coefficient and effective optical path length, or, in other words, the real and imaginary part of the complex reflection coefficient. These are the unique advantageous embodiments according to the present invention and cannot be achieved in the conventional microscopy.

Figure 5:
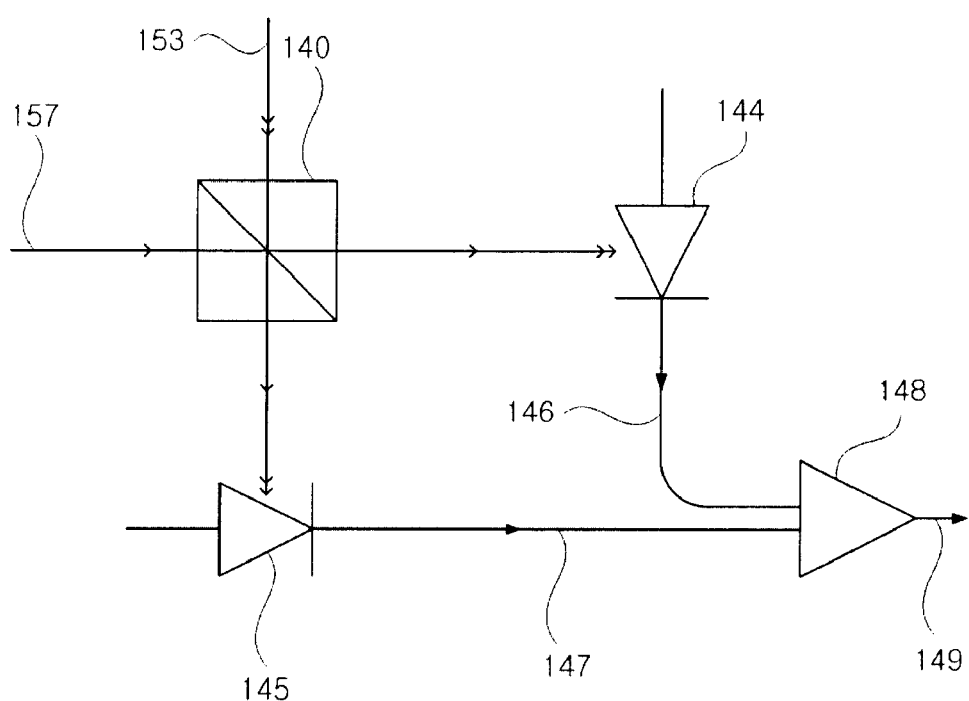
FIG. 5 illustrates a balanced detection scheme typically used in interferometry.

FIG. 5 illustrates the balanced heterodyne detection scheme. The probe beam 153 reflected from or transmitted through the sample is combined with the reference beam 157 by using the beam splitter 140, if the reflected probe beam 153 and the reference beam 157 have the same polarization. Intensity of the output beams from two output ports of the beam splitter 140 are measured by the corresponding photodiodes 144 and 145. As mentioned earlier, the interference signals are added by subtracting output electrical signals 146 and 147 from the corresponding photodiodes while the correlated intensity noise can be rejected. Since the phase and amplitude modulation is carried by intermediate frequency beat signal in the heterodyne interferometer, low frequency correlated noises can also be rejected by using a high-pass or band-pass filter. Therefore, if 3 dB loss in signal power is acceptable, the balanced detection scheme can be omitted or one of the two photodiodes and differential amplifier can be eliminated. The output signal 147 from the balanced detector 149 or from one photodiode can be sent to the I/Q-demodulator to obtain I- and Q-signal represented by the mathematical equations 4 and 5, respectively.

Figure 6:
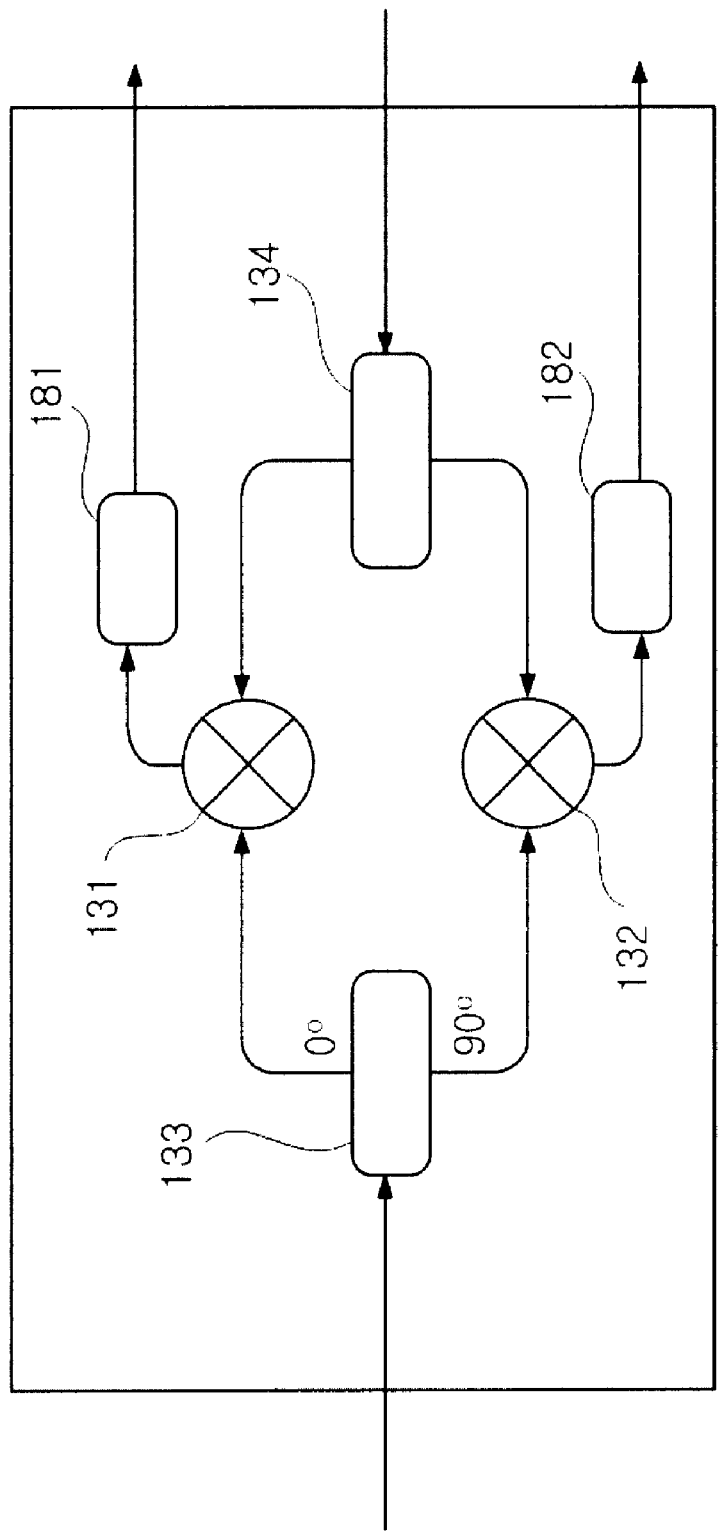
FIG. 6 is a block diagram showing an internal structure of an I/Q-demodulator used in the heterodyne interferometer.

FIG. 6 illustrates the schematics of the basic components in an I/Q-demodulator 130. The output signal 149 from the balanced detector represented by mathematical equation 3 or output signal 147 from one photodiode drives the RF input port of the I/Q-demodulator 130. The RF input signal is split into two signals by the 3 dB power splitter 134 and each signal drives the RF input of the corresponding RF mixers, 131 and 132. The RF local oscillator signal 129 in FIGS. 7 and 8 or 128 in FIG. 9, driving the local oscillator port of the I/Q-demodulator 130, is split into two references by the 3 dB, 90° hybrid coupler 133 so that the RF references driving the corresponding RF mixers have the 90° phase difference. After making proper low-pass-filtering by low pass filters 181 and 182, the output baseband signals from the mixers 131 and 132 have 90° phase difference and, thereby, the resulting I and Q outputs, respectively, are represented by mathematical equations 4 and 5. The resulting I and Q outputs from the low pass filters 181 and 182 are digitized by using an analog-to-digital converter 185 and the digitized signals are stored and processed in the computer 180.

The driver 175 for the scanner 170 is remotely controlled by the computer 180 and the scanning information is stored in the computer from which the coordinates of the scanning points can be calculated. Absolute coordinates of the scanning points can also be stored if the scanner is interface with the position sensor. Phase and amplitude maps can be obtained by processing the scanning data in terms of the corresponding coordinates of the scanning point.

Various optical arrangements can be used for the heterodyne I/Q-interferometer in the scanning microscope according to the present invention as described above. Hereinafter, embodiments of the different types of the heterodyne interferometer in the scanning microscope according to the present invention will be described.

Figure 7:
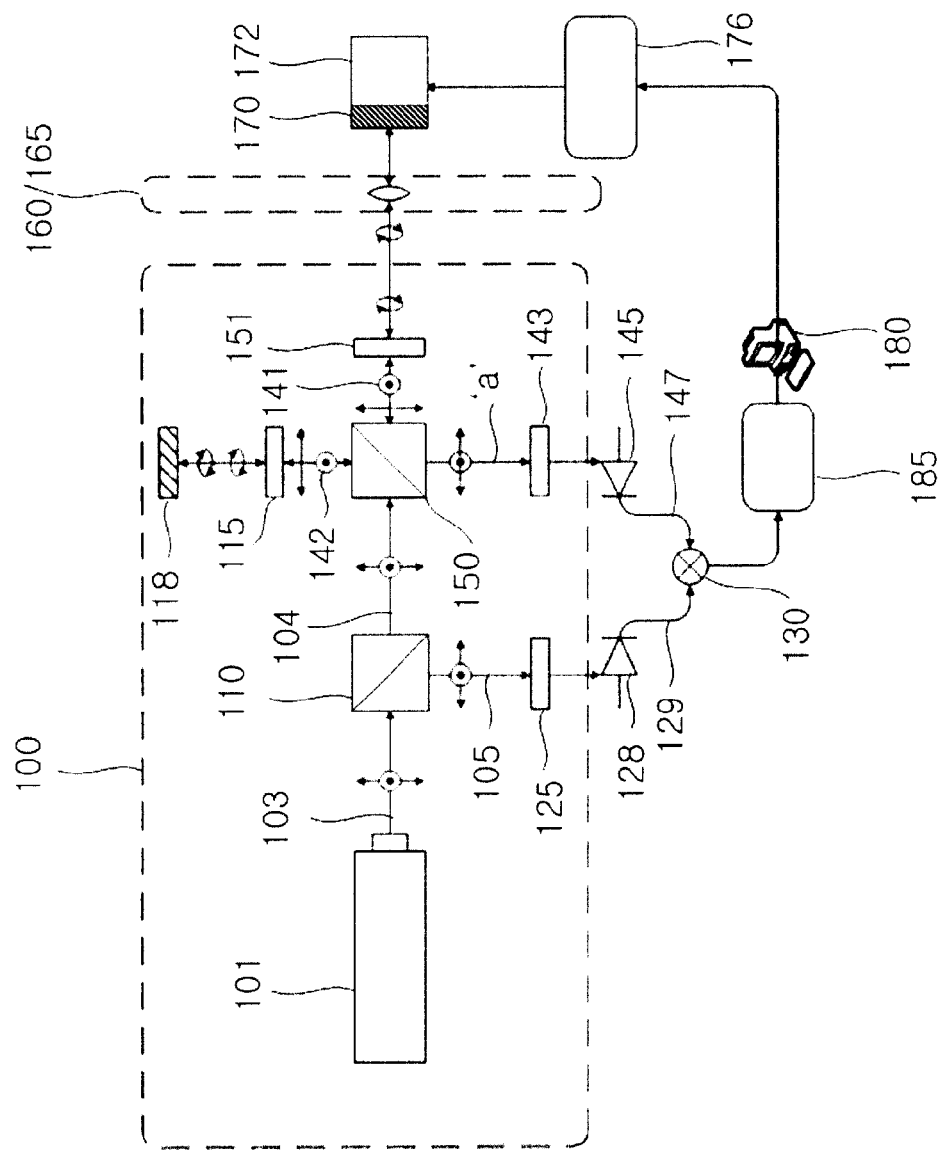
FIG. 7 shows an instrumentation for one exemplary embodiment of the heterodyne interferometer in the scanning microscope according to the present embodiment.
Figure 8:
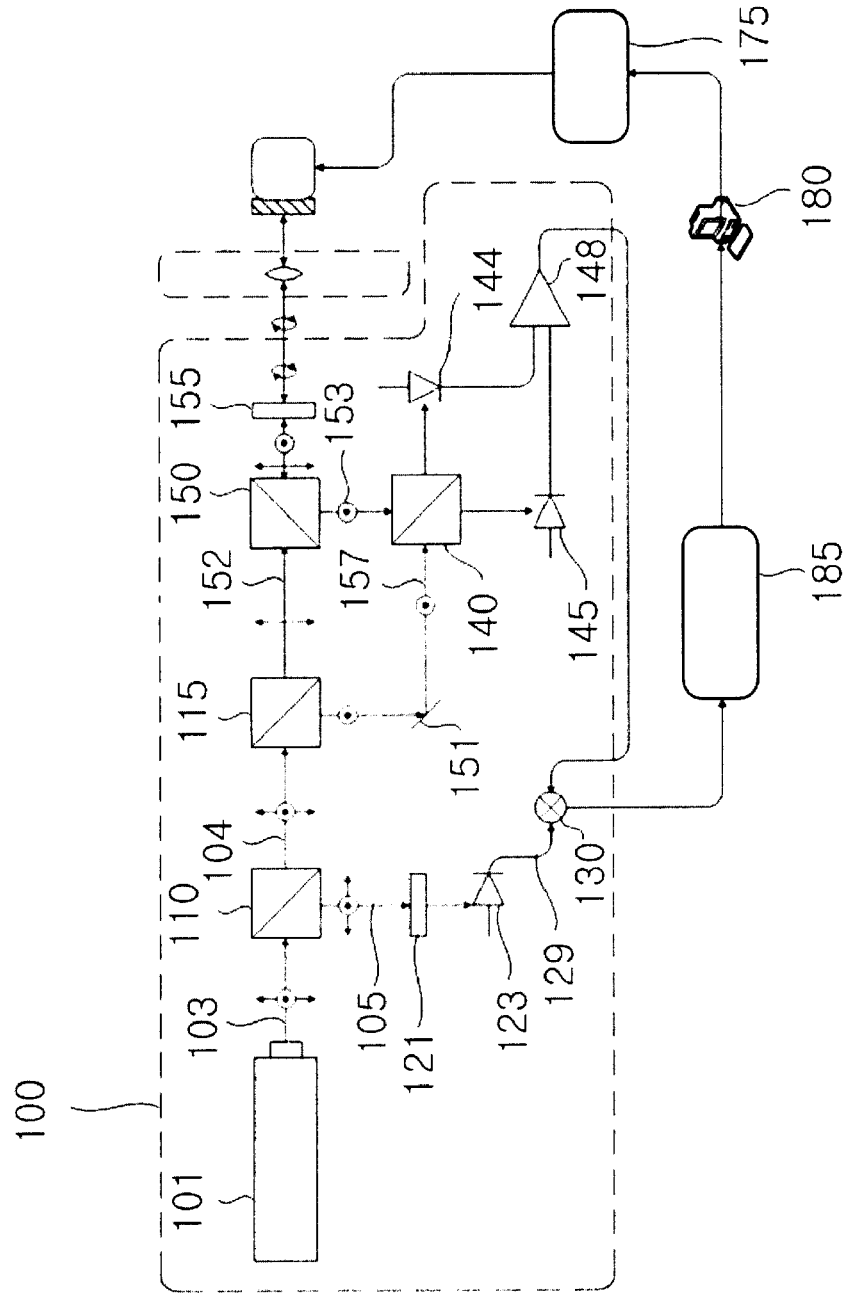
FIG. 8 shows an instrumentation for the other exemplary embodiment of the heterodyne interferometer in the scanning microscope according to the present embodiment.
Figure 9:
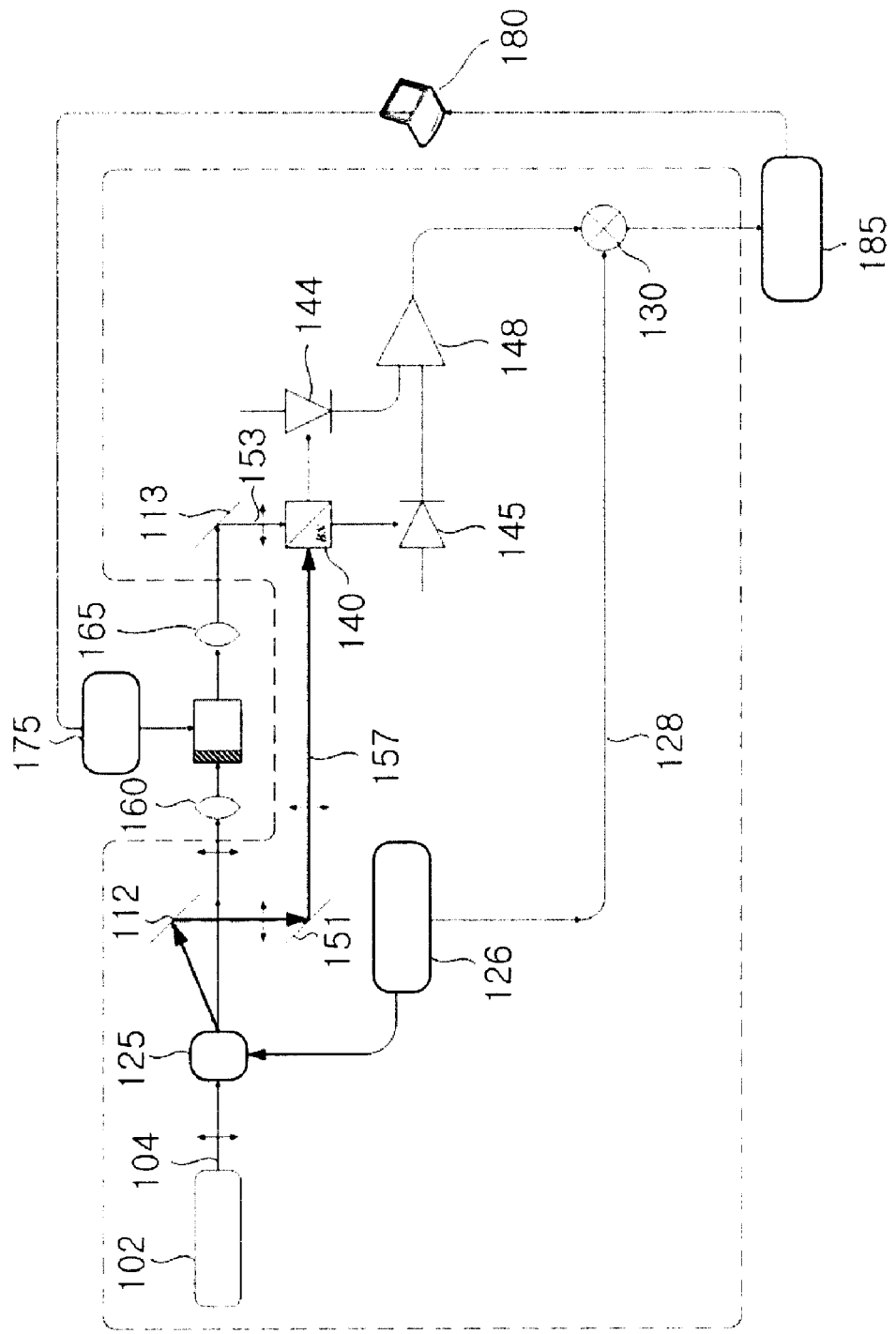
FIG. 9 shows an instrumentation for the other exemplary embodiment of the heterodyne interferometer in the scanning microscope according to the present embodiment.

FIG. 7 shows the first exemplary optical arrangement of an embodiment of the heterodyne interferometer used in the scanning microscope according to the present invention, which employees the modified Michelson interferometer scheme with a reflection geometry and uses a dual frequency, dual polarization, stabilized laser as a light source. FIG. 8 shows the second exemplary optical arrangement of an embodiment of the heterodyne interferometer used in the scanning microscope according to the present invention, which employees a modified Mach-Zehnder interferometer scheme with a reflection geometry, balanced detection scheme, and uses a dual frequency, dual polarization, stabilized laser as a light source. FIG. 9 shows the third exemplary optical arrangement of an embodiment of the heterodyne interferometer used in the scanning microscope according to the present invention, which employees a modified Mach-Zehnder interferometer scheme with a transmission geometry, balanced detection scheme and uses acousto-optic frequency shifter to generate the probe and reference beam with different frequencies.

In the above three examples, two archetypal ways of obtaining the probe beam and reference beam are shown and two archetypal ways of constructing heterodyne interferometers are also shown. These schemes can be operated in either the reflection or the transmission geometry, even though all possible combinations of embodiments are not shown.

In the first exemplary embodiment of the heterodyne interferometer shown in FIG. 7, the output beam 103 from a dual-frequency, dual-polarization, stabilized laser 101 is divided into two paths by using a beam splitter 110. Two polarization modes in the reflected beam 105 from the beam splitter 110 are mixed by use of the polarizer 125 oriented at 45° to the polarization direction and the photodiode 128. The intermediate frequency beat signal 129 from the photodiode 128 is used as the local oscillator (LO) in RF I/Q-demodulation. Polarization modes of the transmitted beam 104 through the beam splitter 110 are separated by use of a polarization beam splitter 150 and used as the probe beam and the reference beam. The reference beam 142, the reflected beam from 110 in the FIG. 7, returns to 110 by use of the quarter-wave plate or 45° Faraday rotator 115 and the mirror 118. The plane of polarization of the returning beam is rotated by 90° because of the double pass in the quarter-wave plate or 45° Faraday rotator 115 and, thereby, the reference beam is transmitted through the beam splitter 110.

The probe beam 141, the transmitted beam through the beam splitter 110 in the FIG. 7, after passing through the quarter-wave plate or 45° Faraday rotator 151, is focused onto the sample by use of a focusing device 160. Reflected beam from the sample 170 is recollimated by the focusing device 160 and returns to the beam splitter 110 after making double pass at the focusing device 160, in which the plane of polarization is rotated by 90°. The probe beam carries the phase and amplitude modulation induced by the topography and material property of the surface under test. The probe beam is reflected at the polarizing beam splitter 110 and combined with the reference beam. The reference beam and the probe beam are mutually orthogonally polarized and propagate along the same path. The probe and reference beam are mixed together by use of a polarizer or polarizing beam splitter 143 oriented at 45° to the plane of polarization and the intermediate frequency heterodyne beat signal 147 from the photodiode 145 carries the phase amplitude modulation. A balanced detection scheme can also be used to improve the sensitivity.

The overall arrangements are the same as those in FIG. 5, except that a beam splitter 140 is replaced by the polarizing beam splitter which is oriented at 45° to the planes of polarization of the probe beam and reference beam.

As shown in FIGS. 6 and 7, the heterodyne beat signal 147 is used as the RF input signal in I/Q-demodulator 130 and split into two signals by using a 3 dB power splitter 134, while the RF local oscillator signal 129 is split in two LOs by using a 3 dB 90° power splitter 133, by which the resulting LOs have 90° phase difference with respect to each other. Since a harmonics of LO is used in a commercial I/Q-demodulator, although it is not shown in the figure, a frequency multiplier can be used to obtain the appropriate LO frequency. A bandpass filter or a high-pass filter can also be used in front of the two power splitter 133 and 134 to reject DC components and any other low frequency noises. The resulting RF signals and LOs are mixed at the corresponding mixers 131 and 132. After passing through the low-pass filters 181 and 182, the resulting IF signal from the mixers 131 and 132 are given by mathematical equations 4 and 5, respectively. The output signals from the I/Q-demodulation unit are digitized by use of a multi-channel A/D-converter 185. The digitized I and Q data are stored and processed in the computer 180. The computer 180 is also used for controlling the scanner driver 176, which drives the scanner 170. The scanner 170 moves either the sample or the probe beam in XY-direction, the direction perpendicular to the propagation direction of the probe beam. A user can give control parameters and instructions to the scanner driver 176 by using, for example, a graphic user interface. The computer can store scanning information such as the number of scanning points, step size, and so forth. Absolute scanning positions can also be stored if it is available. The phase and the amplitude can be calculated by using mathematical equations 6 and 7, from which the topographical structure and local variations of the reflectance can be imaged. The computer can also store the processed data and image.

In the second exemplary embodiment of the heterodyne interferometer used in the scanning microscope, a modified Mach-Zehnder interferometer scheme is used as shown in FIG. 8. Most of optical arrangements are the same as those of the previous example shown in FIG. 7 except that the probe beam and the reference beam are propagating along the two geometrically separated paths 152 and 157, respectively, the probe beam reflected from the sample is mixed with the reference beam at the beam splitter 140, and two photodiodes and a differential amplifier is used for the balanced detection.

In the third exemplary embodiment of the heterodyne interferometer used in the scanning microscope operating with transmission geometry, an acousto-optic frequency shifter is used for generating two geometrically separated beams with different frequencies as shown in FIG. 9. A part of the output beam from a laser 102, preferably a stabilized single frequency laser, is frequency shifted and deflected by an acousto-optic frequency shifter 125, while the frequency of the unreflected beam is unchanged. The shift frequency and the diffraction angle are determined by the driving frequency of the acousto-optic frequency shifter 125, which is generally in RF band. The fundamental beam and the deflected beam are used as the probe and reference beam, respectively. The probe beam is focused onto the sample by using a focusing device 160 and the transmitted beam through the sample is collimated by using a collimating device 165. The interference signal is obtained by use of a balanced detector as shown in the figure. The arrangements for signal processing are the same as those of the previous examples.

In all, details of the three major exemplary embodiments of the heterodyne interferometer used in the scanning microscope are given above.

Having described a preferred embodiment of the present invention, it is to be understood that variants and modifications thereof falling within the spirit of the invention may become apparent to those skilled in this art, and the scope of this invention is to be determined by appended claims and their equivalents.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A scanning microscope using a heterodyne interferometer comprising:
   a heterodyne interferometer comprising:
      a laser which delivers a probe beam to a sample;
      a first beam splitter which mixes the probe beam reflected from or transmitted through the sample back into the heterodyne interferometer and a reference beam to generate a heterodyne beat signal which carries phase and amplitude change in the probe beam;
      a second beam splitter which provides a local oscillator (LO) signal for radio frequency (RF) mixing based on the probe beam; and
      an I/Q-demodulator which demodulates the heterodyne beat signal to provide I- and Q-signal based on the heterodyne beat signal and the local oscillator signal;
   a scanner which scans the sample in two directions perpendicular to a propagating direction of the probe beam;
   a scanner driver which actuates the scanner;
   a focusing device which focuses an output probe beam from the heterodyne interferometer onto a surface or inside of the sample;
   a collimating device which collimates the probe beam reflected from or transmitted through the sample;
   an analog to digital (A/D) converter which digitizes the output I-signal and Q-signal from the heterodyne interferometer; and
   a computer which receives, stores, and processes the I- and Q-signal from the A/D converter to simultaneously obtain phase and amplitude information of the probe beam from the I- and Q-signal, extracts structural and/or material information for the sample using the obtained phase and amplitude information, and transfers control commends for actuating the scanner to the scanner driver.

2. The scanning microscope using a heterodyne interferometer as set forth in claim 1, wherein the scanning microscope is operated as a reflection geometry for scanning, wherein said focusing device focuses the probe beam onto the sample and recollimates the probe beam reflected from the surface of the sample by using the focusing device.

3. The scanning microscope using a heterodyne interferometer as set forth in claim 1, wherein the scanning microscope is operated as a transmission geometry for scanning, wherein said focusing device focuses the probe beam and the collimating device collimates the probe beam transmitted through the sample.

4. The scanning microscope using a heterodyne interferometer as set forth in claim 1, wherein a dual-frequency, dual-polarization, stabilized laser is used as a light source in the heterodyne interferometer.

5. The scanning microscope using a heterodyne interferometer as set forth in claim 1, wherein an acousto-optic modulator which shifts the frequency of the one of the probe beam and the reference beam in the heterodyne interferometer.

* * * * *